US008663540B2

(12) United States Patent
Reineke

(10) Patent No.: US 8,663,540 B2
(45) Date of Patent: Mar. 4, 2014

(54) EXPANDED GRAPHITE FOIL HEATER TUBE ASSEMBLY AND METHOD OF USE

(76) Inventor: Leland M. Reineke, Medina, OH (US)

( * ) Notice: Subject to any disclaimer, the term of this patent is extended or adjusted under 35 U.S.C. 154(b) by 1034 days.

(21) Appl. No.: 11/776,152

(22) Filed: Jul. 11, 2007

(65) Prior Publication Data

US 2008/0014444 A1 Jan. 17, 2008

Related U.S. Application Data

(60) Provisional application No. 60/807,140, filed on Jul. 12, 2006.

(51) Int. Cl.

| | |
|---|---|
| ***B29C 35/02*** | (2006.01) |
| ***B29C 35/08*** | (2006.01) |
| ***B28B 1/00*** | (2006.01) |
| ***B28B 3/00*** | (2006.01) |
| ***B28B 5/00*** | (2006.01) |
| ***C04B 33/32*** | (2006.01) |
| ***C04B 33/36*** | (2006.01) |
| ***C04B 35/64*** | (2006.01) |
| ***B29B 15/00*** | (2006.01) |
| ***B29C 39/14*** | (2006.01) |
| ***B29C 49/00*** | (2006.01) |
| ***B29C 49/08*** | (2006.01) |
| ***B29C 55/00*** | (2006.01) |
| ***B29C 67/20*** | (2006.01) |
| ***B29D 7/00*** | (2006.01) |
| ***B28B 3/06*** | (2006.01) |
| ***B27N 3/18*** | (2006.01) |
| ***B28B 3/02*** | (2006.01) |

(52) U.S. Cl.

USPC ........... 264/404; 264/402; 264/645; 264/566; 264/297.2; 264/319; 264/320; 264/328.1; 264/668; 419/8; 419/9

(58) Field of Classification Search

USPC ............. 264/402, 404, 645, 566, 297.2, 319, 264/320, 328.1, 668; 419/8–9

See application file for complete search history.

(56) References Cited

U.S. PATENT DOCUMENTS

| | | | | |
|---|---|---|---|---|
| 3,404,061 | A | 10/1968 | Shane et al. | |
| 3,745,623 | A | 7/1973 | Wentorf, Jr. et al. | |
| 3,767,371 | A | 10/1973 | Wentorf, Jr. et al. | |
| 4,591,166 | A | 5/1986 | Atkinson et al. | |
| 5,135,893 | A * | 8/1992 | Dohi et al. | 501/91 |
| 5,512,235 | A | 4/1996 | Cerutti et al. | |
| 5,628,520 | A | 5/1997 | Ueda et al. | |
| 5,976,437 | A * | 11/1999 | Marrocco et al. | 264/126 |
| 6,116,611 | A * | 9/2000 | Ozaki et al. | 277/396 |
| 6,447,560 | B2 | 9/2002 | Jensen et al. | |
| 2005/0110187 | A1 * | 5/2005 | Pope et al. | 264/248 |

* cited by examiner

*Primary Examiner* — Christopher Schatz
*Assistant Examiner* — Matthew Hoover
(74) *Attorney, Agent, or Firm* — Christopher L. Parmelee; Walker & Jocke

(57) ABSTRACT

A heater tube is provided for use in a method of producing a diamond or cubic boron nitride (CBN) tipped cutting tool by sintering a mass of crystalline particles to a metal carbide. The heater tube has a cylindrical shape and is comprised of a plurality of windings of an expanded graphite foil which are compressed together. In the method, a heater tube assembly is formed which comprises the metal carbide substrate positioned within the heater tube and a mass of diamond or CBN particles positioned within the heater tube adjacent the substrate. The method includes simultaneously applying sufficient levels of pressure to the heater tube assembly and sufficient levels of electrical current to the heater tube assembly for a sufficient amount of time to cause sintering of the crystalline particles and bonding to the substrate to form a diamond or CBN tipped cutting tool.

16 Claims, 4 Drawing Sheets

EXPANDED GRAPHITE FOIL HEATER TUBE ASSEMBLY AND METHOD OF USE

CROSS REFERENCE TO RELATED APPLICATIONS

This application claims benefit of U.S. Provisional Application Ser. No. 60/807,140 filed Jul. 12, 2007, which is hereby incorporated herein by reference.

TECHNICAL FIELD

This invention relates to methods of producing diamond or cubic boron nitride tipped cutting tools. Specifically this invention relates to a new graphite electrical resistence heater tube used during processes for sinterizing and bonding diamond or cubic boron nitride particles to metal carbide substrates.

BACKGROUND ART

Methods of making polycrystalline diamond and/or cubic boron nitride (CBN) cutting tools are well known. Such methods may include placing within a machined graphite heater tube, a substrate such as a metal carbide shank and an unsintered mass of abrasive crystalline diamond or CBN particles adjacent the substrate. Additional salt plugs, salt liners, and graphite end plugs may also be placed within the heater tube, which plugs or liners substantially remove cavities or voids within the heater tube. Metal end caps may be placed adjacent each end of the heater tube to provide electrical contacts for applying a current to the heater tube.

The resulting heater tube assembly may then be placed within a correspondingly shaped cavity of a high-pressure cell comprised of salt or talc, which cell is in turn placed within a high-pressure press. The entire assembly is compressed under high pressure, and an electrical current is applied to produce sufficiently high pressures and temperatures to effect intercrystalline bonding between adjacent grains of the abrasive particles and joining of the sintered particles to the metal carbide substrate. U.S. Pat. No. 3,767,371 of Oct. 23, 1973, U.S. Pat. No. 3,745,623 of Jul. 17, 1973, and U.S. Pat. No. 5,512,235 of Apr. 30, 1996, which are hereby incorporated by reference herein, show various examples of prior art methods in which heater tubes are employed in high temperature and pressure systems to produce diamond or CBN polycrystalline compacts which are bonded to a metal carbide substrate. The resulting diamond tipped or CBN tipped substrates are then integrated into a cutting tool used for drilling, milling, grinding, sawing or any other high pressure and temperature application.

Prior art heater tubes must be constructed within precise tolerances with respect to their dimensions to ensure that the variously inserted substrates, particle holding salt dishes, salt liners, and graphite plugs fill substantially all of the space within the heater tube. In the prior art, to produce heater tubes with the required dimensions, the heater tubes are machined from extruded graphite. However, extruded graphite tends to be relatively brittle; as a result, some heater tubes will crack during the preparation of the heater tube and/or when high pressures are applied as described above. Such cracks may disrupt the uniform generation of heat from the applied electrical current. In these cases, the resulting diamond or CBN tipped tool may be defective.

Thus there exists a need for a new heater tube which can be readily substituted into an existing processes for making diamond or CBN tipped tools and which is less likely to produce defective diamond or CBN tipped tools.

DISCLOSURE OF INVENTION

It is an object of an exemplary form of the present invention to provide an improved method for producing diamond or CBN tipped cutting tools.

It is a further object of an exemplary form of the present invention to provide an improved heater tube for use in a method of producing diamond or CBN tipped cutting tools.

It is a further object of an exemplary form of the present invention to provide an improved heater tube for use in a method of producing diamond or CBN tipped cutting tools, which heater tube is less likely to produce defective diamond or CBN tipped tools.

Further objects of exemplary forms of the present invention will be made apparent in the following Best Modes For Carrying Out Invention and the appended claims.

The foregoing objects may be accomplished in an exemplary embodiment by a heater tube comprised of a plurality of layers of expanded graphite foil which are compressed together. In an exemplary embodiment a continuous sheet or multiple sheets of expanded graphite foil is/are wound a plurality of times around a cylindrical surface. The cylindrical surface has an outer diameter corresponding to the desired inner diameter for the resulting heater tube. The cylindrical surface with graphite foil wound thereabout is then inserted within the inner cylindrical cavity of a mold. The diameter of the cylindrical cavity of the mold corresponds to the desired outer diameter for the resulting heater tube. A compression member is then moved into the mold with sufficient pressure to compress the graphite foil longitudinally into a compacted form with the desired final dimensions corresponding to a prior art graphite heater tube.

This described heater tube may then be used in a high temperature and pressure system designed to cause sintering of diamond and/or cubic boron nitride crystalline particles into a polycrystalline compact which bonds to a metal carbide substrate inside the heater tube. The metal carbide substrate may correspond to a shank which is integrated into a tool for use with drilling, grinding, sawing and/or other cutting operations.

BEST MODES FOR CARRYING OUT INVENTION

Figure 1:
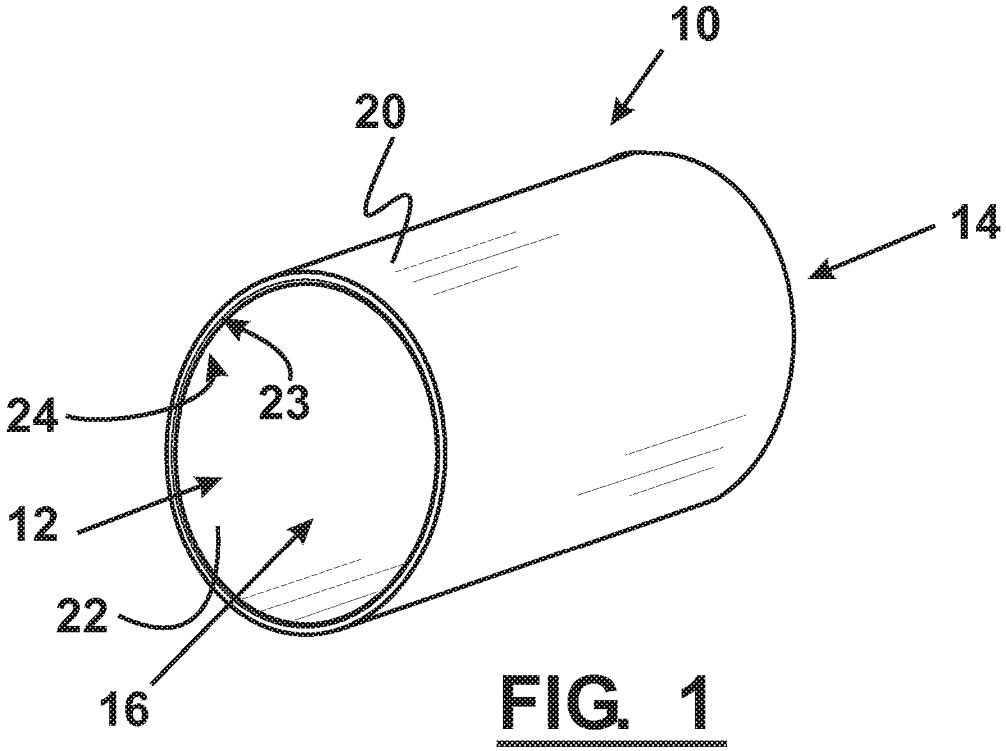
FIG. 1 is a perspective view representative of an example embodiment of a heater tube.

Referring now to the drawings and particularly to FIG. 1, there is shown therein a perspective view of an exemplary embodiment of a heater tube 10. The heater tube may be comprised of a cylindrically shaped annular wall 20 which bounds a cylindrically shaped cavity 16. The heater tube may have two opposed open ends 12, 14. The wall 20 of the heater tube is comprised of a plurality of layers of expanded graphite foil which are compressed into the desired dimensions for the heater tube. For example, in exemplary embodiments, the walls of the heater tube may be comprised of a plurality of windings of at least one flexible expanded graphite foil sheet.

Expanded graphite foil sheets are typically produced for use in high temperature gasket, seal, and packing applications to replace asbestos-based materials and gaskets. Expanded graphite foil is typically a homogenous sheet material produced from graphite flake with no binding materials.

The following is an example of features for an example heater tube and the characteristics of graphite foil sheet that may be wound and compressed to produce heater tubes with the described features.

EXAMPLE

Graphite Foil Sheet Features Prior to Compression into Heater Tube

Thickness of about 0.008 inches;

Fixed Carbon of about 99.0%;

Density of about 1.0 g/cc;

Electrical resistence of about:

9 μohm-meters (parallel to the sheet or with the grain); and

≥650 μohm-meters (perpendicular to the sheet or against the grain)

Width of graphite foil sheet of about 1.75 inches.

Process Features

About four windings/wraps of the graphite foil sheet around a cylindrical surface.

Dimensions of Final Heater Tube After Compression of Wound Graphite Foil Sheet

Outer diameter of about 1.050 inches;

Inner diameter of about 0.9585 inches;

Longitudinal length of about 1.15 inches;

Wall thickness of about 0.045 inches;

Density of final heater tube of about >1.70 g/cc.

Features After Machining of Heater Tube

About 45° chamfer of about 0.015 inches wide on inner edge of each end of tube.

These specific features of the heater tube and the graphite foil sheet used to produce the heater tube is only one example. It is to be understood that the particular dimensions of heater tubes and the properties of the graphite foil used to make the heater tubes will vary depending on the particular process with which the heater tube is intended to be used to produce diamond or cubic boron nitride (CBN) tipped tools.

In the described embodiment, the mechanical compression force alone is operative to keep the compressed graphite foil sheet intact in the form of the heater tube such that no binders or other agent is needed during the molding of the heater tube. In exemplary embodiments the windings of the graphite foil sheet are compressed a sufficient amount (e.g. 30% or more decrease in the longitudinal length of the windings) to create folds in the material. It is believed such folds increase the electrical resistance of the final heater tube because electrical current travels through sections of the graphite that are perpendicular to the original sheet direction or against the grain. In alternative exemplary embodiments the resistance of the final heater tube can be increased or decreased by using graphite foil sheets with different densities and/or using graphite foil sheets with different widths to increase or decrease the size of the folds in the material.

Figure 2:
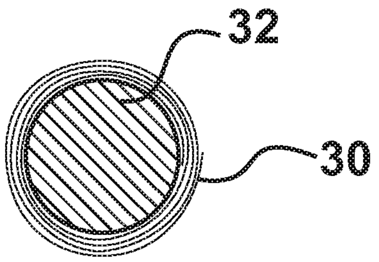
FIG. 2 is a top plan view showing expanded graphite foil wound a plurality of times around a cylindrical surface.

As shown in FIG. 2, in an exemplary embodiment, to form a heater tube with predetermined dimensions from expanded graphite foil, a sheet of expanded graphite 30 with a width larger than the predetermined final length of the heater tube may be wrapped a plurality of times around a cylindrical surface 32. The outer diameter of the cylindrical surface 32 corresponds to the desired predetermined inner diameter of the heater tube.

The number of windings will vary depending on the desired predetermined thickness and length of the heater tube. In the embodiment shown in the above example, the graphite foil sheet is wound about four times around a cylindrical surface. After winding the graphite foil around the cylindrical surface, the thickness of the four layers of the windings will be less than the predetermined final thickness of the heater tube and the width of the windings will be greater than the predetermined length of the heater tube. To form a heater tube with the predetermined dimensions, the windings around the cylindrical surface are compress in the longitudinal direction of the cylindrical surface.

Figure 3:
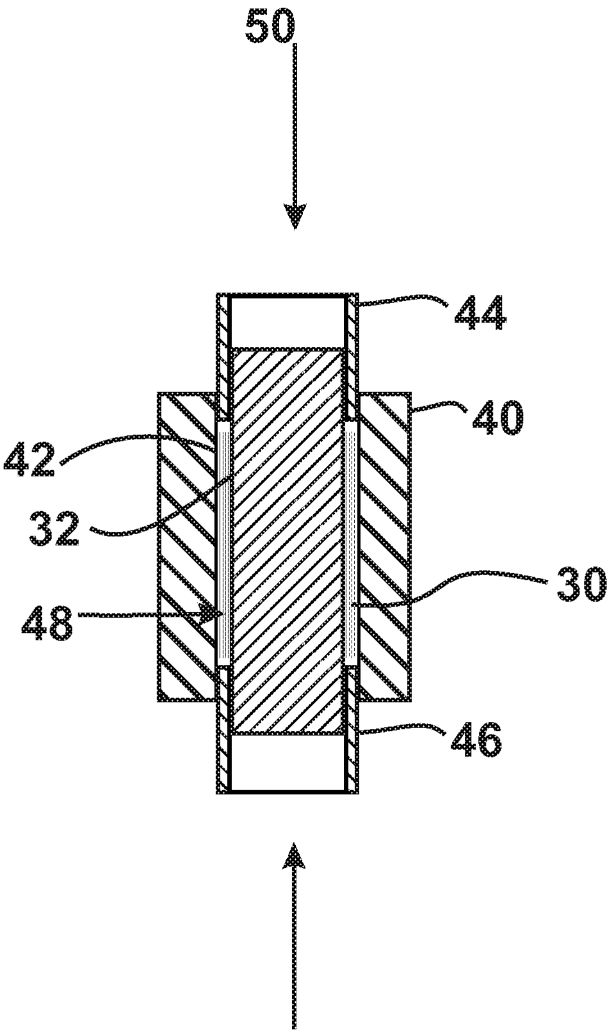
FIG. 3 is a side cross-sectional view showing the wound graphite foil positioned within a cylindrical cavity of a mold.

As shown in FIG. 3, in an exemplary embodiment, compression of the wound graphite foil is performed by placing the wound graphite foil sheet 30 and the cylindrical surface 32 within a mold 40 that has a cavity with cylindrical wall 42 with an inner diameter that corresponds to the predetermined final outer diameter of the heater tube.

The wound graphite foil may then be compressed in the longitudinal direction 50 with at least one compressing member 44, 46. The compressing members may include, for example, annular rings or tubes 44, 46 with inner and outer diameters which substantially fill a uniform annular gap 48 between the cylindrical surface 32 and the cylindrical inner wall 42 of the mold. The compressing members 44, 46 are moved a sufficient distance with respect to the mold and cylindrical surface, to reduce the widths of the windings so as to correspond to the final predetermined longitudinal length of the heater tube and to increase the outer diameter of the windings to correspond to the final predetermined outer diameter for the heater tube.

In an exemplary embodiment, the compacted form of the graphite foil includes a plurality of folds which resist separation of the multiple layers. In the described exemplary embodiment, a single sheet of expanded graphite foil may be wound four times to produce the wall of the heater tube. However, it is to be understood that in alternative exemplary embodiments two or more sheets of overlapped graphite foil may be wound multiple times to form the wall of the heater tube. Also in further alternative exemplary embodiments, a first graphite foil sheet may be wound one or more times around the cylindrical surface and then one or more additional graphite foil sheets may be wound one or more times around the first graphite foil sheet. In further alternative embodiments, other patterns of winding one or more sheets of expanded graphite foil may be used to form the wall of the heater tube.

In the exemplary embodiment, the described heater tube comprised of compressed windings of an expanded graphite foil is used in a high temperature and high pressure (HT/HP) system designed to cause sintering of diamond and/or cubic boron nitride (CBN) crystalline particles into a polycrystalline compact which bonds to a metal carbide substrate inside the heater tube.

Examples of such HT/HP systems and processes used to produce diamond and/or CBN compacts bonded to substrates are shown in U.S. Pat. Nos. 3,767,371, 3,745,623 and 5,512,235. The following includes an example of how the described heater tube may be used in an example embodiment of an HT/HP system. However, is to be understood that the described heater tube comprised of compressed windings of expanded graphite foil may be used in other embodiments of HT/HP systems which are operative to sinterize crystalline particles in a compact that is bonded to a substrate.

Figure 4:
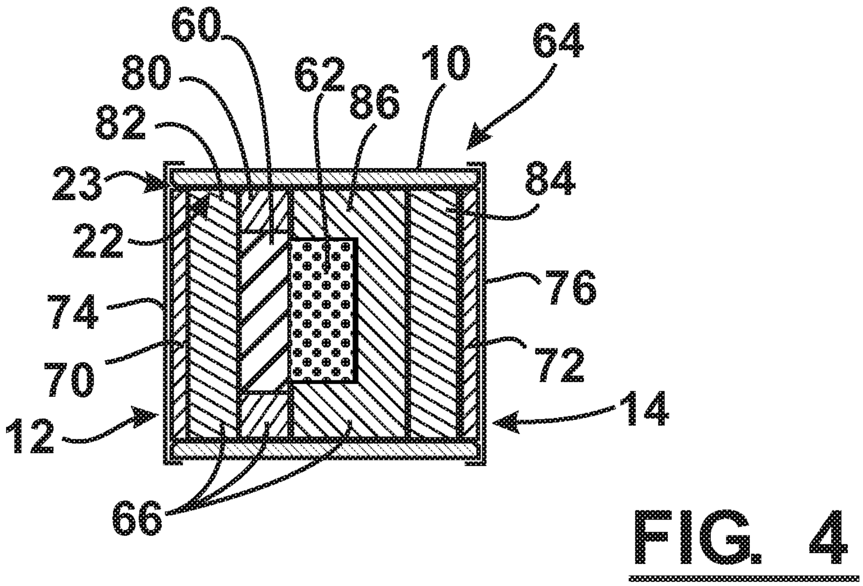
FIG. 4, is side cross-sectional view of an example embodiment of a heater tube as assembled for use in a high temperature and high pressure process for producing a polycrystalline compact bonded to a metal carbide substrate.

As shown in FIG. 4, at least one substrate 60 and at least one mass of crystalline particles 62 adjacent the at least one substrate may be placed inside the described heater tube 10 (comprised of a plurality of layers of at least one expanded graphite foil compressed together) to form a heater tube assembly 64. In exemplary embodiments, the at least one substrate may be comprised of a metal carbide, such as tungsten, titanium, tantalum, or molybdenum carbide, or mixtures thereof. The substrate may correspond to a shank which can be integrated into a tool.

In exemplary embodiments, the mass of crystalline particles may be comprised of diamond particles, CBN particles or mixtures thereof. Such particles may have diameters which range from less than one micron to greater than 100 microns. In exemplary embodiments a diamond, catalyst or solvent may be mixed with the crystalline particles or added as a layer between the mass of crystalline particles and the substrate to facilitate sintering and bonding to the substrate. Alternatively, metal binder from the sintered metal carbide substrate may sweep from the substrate face through the diamond or CBN particles to promote sintering of the diamond or CBN particles. Alternatively, rather than using a solid substrate, a substrate layer comprised of a sinterable carbide powder mixed with a powdered metal binder may be substituted as is known in the art.

In exemplary embodiments, the heater tube assembly 64 may further include one or more salt workpieces 66 positioned within the heater, which separate the at least one substrate and the at least one mass of crystalline particles from the inner wall surface 22 of the heater tube 10. Such salt workpieces may include cylindrical salt liners, plugs 82, 84, and particle holding dishes 86. In exemplary embodiments, the salt work pieces may be comprised of sodium chloride. However in alternative embodiments, the salt workpieces may also be comprised of a chloride, iodide, or bromide of sodium, potassium, or calcium, or a mixture thereof.

As shown in FIG. 4, in this described example, the heater tube assembly 64 may further include two graphite plugs 70, 72 which are respectively inserted into the two opposed end openings of the heater tube. Also, two metal end caps 74, 76 may be mounted respectively adjacent the two graphite plugs 70, 72 to provide electrical contact used by the HT/HP system to apply an electrical current through the heater tube.

In a typical HT/HP system, the described heater tube assembly is placed in a cylindrical cavity of a high pressure cell assembly comprised of salt or talc. The high pressure cell with the inserted heater tube assembly is mounted within an HT/HP apparatus which is capable of providing sufficient levels of pressure to the high pressure cell and the heater tube assembly therein, and providing a sufficient level of electrical current to the heater tube assembly for a sufficient amount of time to effect sintering of the crystalline particles into a polycrystalline compact layer and bonding of the polycrystalline compact layer to the metal carbide substrate layer.

In general, the HT/HP system is operated to provide thermodynamic conditions in which diamond or CBN is the stable phase and wherein significant reconversion (e.g. graphitization) of crystalline diamond, or CBN particles does not occur. As an example, such conditions may include providing a temperature of between 1000-2000 C and pressure between 20-80 kbar during a time period between 3-120 minutes. It is also to be understood that such pressures and temperatures may not remain constant during the process, but rather may vary to produce the desired physical properties of the polycrystalline compact.

As discussed previously, the described heater tube may be used in other configurations for a heater tube assembly and other embodiments of HT/HP systems and methods. For example, as is known in the art, one or more sets of the substrates and masses of crystalline particles may be placed within a refractory metal container comprised of zirconium, titanium, tantalum, tungsten, or molybdenum, alternatively or a container comprised of another refractory material such as mica, alumina, salt, or a mixture thereof. Such a refractory container may be surrounded with salt liners and/or plugs as described previously and placed within the heater tube.

In addition, the described heater tube may have alternative shapes and configurations. For example, in an exemplary embodiment, the inner edge 24 of both ends of the heater tube may be beveled or chamfered either through the molding process or during a subsequent machining process. However, in alternative exemplary embodiments, the inner edge 24 may not be beveled or chamfered.

In an exemplary embedment, when the described heater tube comprised of windings of graphite foil is employed in a HT/HP system, the described heater tube is relatively more flexible and therefore is relatively more resistant to cracking from applied high temperatures and pressures than prior art heater tubes machined from extruded graphite. In addition, the outer surface of the described heater tube comprised of windings of graphite foil is relatively smoother, allowing inner and outer components of the heater tube assemblies to be assembled with less breakage occurring.

Heater tubes comprised of multiple windings of expanded graphite foil may also have a relatively higher electrical resistance with respect to a prior art heater tube of the same dimensions machined from extruded graphite. This higher resistance allows use of a lower amperage current to achieve the same temperature in a HT/HP system. The resulting improved heating efficiency may allow use of smaller electrical feed wires to the heater tube and allow for reduced requirements for coolant for these electrical feed wires.

Thus the new graphite heater tube achieves one or more of the above stated objectives, eliminates difficulties encountered in the use of prior devices and systems, solves problems and attains the desirable results described herein.

In the foregoing description certain terms have been used for brevity, clarity and understanding; however, no unnecessary limitations are to be implied therefrom, because such terms are used for descriptive purposes and are intended to be broadly construed. Moreover, the descriptions and illustrations herein are by way of examples, and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A method for making a substrate supported compact comprising:

a) forming a heater tube assembly by loading a heater tube to include therein at least one substrate and a plurality of crystalline particles positioned adjacent the at least one substrate, wherein the heater tube includes a cylindrical wall, wherein the cylindrical wall of the heater tube is comprised of a plurality of wound layers of at least one expanded graphite foil sheet, which plurality of layers include a plurality of folds that are compressed together; and b) applying sufficient levels of pressure to the heater tube assembly and a sufficient level of electrical current to the heater tube assembly for a sufficient amount of time to produce from the crystalline particles a compact layer that is bonded to the at least one substrate.

2. The method according to claim 1, wherein in (a) the crystalline particles comprise at least one of diamond particles and cubic boron nitride particles.

3. The method according to claim 1, wherein in (a) the cylindrical wall of the heater tube is comprised of a plurality of windings of a single expanded graphite foil sheet.

4. The method according to claim 3, wherein in (a) the cylindrical wall of the heater tube is comprised of at least four windings of a single expanded graphite foil sheet.

5. The method according to claim 3, wherein in (a) the plurality of layers of the single expanded graphite foil sheet are compressed together along the longitudinal axis of the cylindrical wall of heater tube to form the folds.

6. The method according to claim 4, wherein in (a) the at least one substrate is comprised of a metal carbide comprised of at least one of tungsten, titanium, tantalum, and molybdenum.

7. The method according to claim 1, wherein in (a) the heater tube has a length along its longitudinal axis which is greater than an outer diameter of the heater tube.

8. The method according to claim 1, wherein (a) includes lining an inner surface of the heater tube with at least one salt work piece, wherein the at least one salt work piece separates the inner surface of the heater tube from the at least one substrate and the plurality of crystalline particles.

9. The method according to claim 1, wherein in (b) the pressure level is at least 20 kbars, the temperature is at least 1000C, and the time is at least three minutes.

10. The method according to claim 1, comprising prior to (a):

c) producing the heater tube including:

i) winding the at least one expanded graphite foil sheet around a cylindrical surface;

ii) while the at least one expanded graphite foil sheet is wound around the cylindrical surface, compressing the at least one expanded graphite foil sheet in at least one direction along a longitudinal axis of the cylindrical surface to form the plurality of folds in the cylindrical wall of the heater tube.

11. A method of producing a heater tube assembly for use in a method of producing a substrate supported compact comprising:

a) providing a heater tube having a cylindrical wall comprised of a plurality of wound layers of at least one expanded graphite foil sheet, which plurality of layers include a plurality of folds that are compressed together, wherein the heater tube is produced by:

i) winding the at least one expanded graphite foil sheet around a cylindrical surface; and ii) while the at least one expanded graphite foil sheet is wound around the cylindrical surface, compressing the at least one expanded graphite foil sheet in at least one direction along a longitudinal axis of the cylindrical surface to form the plurality of folds in the cylindrical wall of the heater tube; and b) subsequent to (a) forming the heater tube assembly by loading the heater tube to include therein at least one substrate and a plurality of crystalline particles positioned adjacent the at least one substrate.

12. The method according to claim 11, further comprising:

c) simultaneously, applying sufficient levels of pressure to the heater tube assembly and sufficient levels of electrical current to the heater tube assembly for a sufficient amount of time to produce with the crystalline particles a compact layer that is bonded to the at least one substrate.

13. The method according to claim 11, wherein in (a)(i) the at least one expanded graphite foil sheet includes a homogenous sheet of graphite flake that is wound more than once around the cylindrical surface.

14. The method according to claim 13, wherein in (b) the heater tube does not include a binding agent to hold the heater tube together.

15. The method according to claim 1, wherein in (a) the at least one expanded graphite foil sheet includes a homogenous sheet of graphite flake that is wound more than once around a cylindrical inner cavity of the heater tube.

16. The method according to claim 15, wherein in (a) the heater tube does not include a binding agent to hold the heater tube together.

* * * * *